(12) United States Patent
Wang

(10) Patent No.: US 10,866,459 B2
(45) Date of Patent: Dec. 15, 2020

(54) BACKLIGHT MODULE AND DISPLAY DEVICE

(71) Applicant: XIAMEN TIANMA MICRO-ELECTRONICS CO., LTD., Xiamen (CN)

(72) Inventor: Yatao Wang, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 105 days.

(21) Appl. No.: 16/357,826

(22) Filed: Mar. 19, 2019

(65) Prior Publication Data

US 2020/0192159 A1 Jun. 18, 2020

(30) Foreign Application Priority Data

Dec. 18, 2018 (CN) .......................... 2018 1 1548978

(51) Int. Cl.
G02F 1/13357 (2006.01)
G02F 1/1335 (2006.01)
F21V 8/00 (2006.01)

(52) U.S. Cl.
CPC ..... *G02F 1/133606* (2013.01); *G02B 6/0025* (2013.01); *G02B 6/0031* (2013.01); *G02F 1/133553* (2013.01); *G02B 6/002* (2013.01); *G02B 6/0021* (2013.01); *G02B 6/0061* (2013.01); *G02F 1/133603* (2013.01); *G02F 1/133605* (2013.01); *G02F 1/133611* (2013.01)

(58) Field of Classification Search
CPC .... G02B 6/002; G02B 6/0021; G02B 6/0058; G02B 6/0061; G02F 1/133605; G02F 1/133603; G02F 1/133606; G02F 1/133611
See application file for complete search history.

(56) References Cited

U.S. PATENT DOCUMENTS

| 10,520,662 | B1* | 12/2019 | Chen ................... H04M 1/0266 |
| 2012/0320625 | A1* | 12/2012 | Ishimoto .............. G02B 6/0088 362/602 |
| 2013/0265524 | A1* | 10/2013 | Chang .................. G02B 6/0088 349/65 |

(Continued)

FOREIGN PATENT DOCUMENTS

CN 202815258 U 3/2013

*Primary Examiner* — Michael H Caley
*Assistant Examiner* — Jonathan Y Jung
(74) *Attorney, Agent, or Firm* — Anova Law Group PLLC

(57) ABSTRACT

Backlight module and display device are provided. The backlight module includes: a light-emitting area, a non-light-emitting area, at least one notch, a shell, a light source, and a light guide plate, wherein the light-emitting area includes a first edge and a second edge; the first edge includes a sub-edge; the light source is on at least one side of the light guide plate; the light-emitting area includes at least one compensation area adjacent to the notch, and the compensation area is on a side of the notch away from the light source; the light guide plate includes a first portion and a second portion, and the first portion is in the compensation area; a thickness of the first portion is greater than a thickness of the second portion; and a plurality of protrusions is on a side surface of the first portion facing toward the back plate.

20 Claims, 15 Drawing Sheets

(56) References Cited

U.S. PATENT DOCUMENTS

| | | | |
|---|---|---|---|
| 2015/0212262 A1* | 7/2015 | Chiang | G02B 6/0093 |
| | | | 362/611 |
| 2016/0018590 A1* | 1/2016 | Uchida | G02B 6/002 |
| | | | 362/611 |
| 2017/0082788 A1* | 3/2017 | Brown | G02B 6/0038 |

* cited by examiner

BACKLIGHT MODULE AND DISPLAY DEVICE

CROSS-REFERENCES TO RELATED APPLICATIONS

This application claims the priority of Chinese Patent Application No. 201811548978.6, filed on Dec. 18, 2018, the content of which is incorporated herein by reference in its entirety.

TECHNICAL FIELD

The present disclosure generally relates to the field of display technology and more particularly, relates to a backlight module and a display device.

BACKGROUND

In conventional display devices, screens of displays, televisions, mobile phones, tablet computers, etc., are often regular rectangles. However, with the continuous development of display technology and the user's diversified needs for the appearances of display devices, simple rectangular display devices have been unable to meet the needs of consumers, so display devices with various shapes have emerged. In conventional technologies, the shapes of the display panels are designed to shapes other than regular rectangles, and such display panels are referred to irregularly-shaped display panels. The irregularly-shaped display panels may enable the screen shapes of the display devices to be diversified and may be applied to products such as advertisement display screens, information indication screens, in-vehicle display screens, smart bracelets, VR/AR glasses, etc., which have a wide range of use. In addition, the shape design of the irregularly-shaped display panels may also avoid some functional modules on the front panels of the display devices such as camera modules, sensor modules or speaker modules, etc., thereby improving the screen-to-body ratios of the display devices and making the display effect more prominent, so the irregularly-shaped display panels have been more and more widely used.

In the conventional display devices, the display panels are mainly divided into two main technologies including liquid crystal display panels and organic light-emitting diode display panels. The liquid crystal display may form an electric field capable of controlling the deflection of the liquid crystal molecules by supplying suitable voltages to a pixel electrode and a common electrode. The conventional liquid crystal display screen may not be self-emitting and is a passive light-emitting component where a backlight module under the liquid crystal display screen is mainly used to provide a light source. The combination of the backlight source and the liquid crystal display screen constitutes a liquid crystal display module. The backlight module is one of the key components of the liquid crystal display panel and can provide sufficient luminance and uniform light sources to display images normally. In the conventional technology, the backlight module may be divided into an edge-lit backlight module and a direct backlight module. The light source of the edge-lit backlight module is a single light source placed on a side and may enter from the side of the light guide plate, which has characteristics of light weight, thin shape, narrow frame and low power consumption. The whole surface of the self-emitting light source of the direct-lit backlight module is placed directly under the light emitting surface of the backlight module, and the accommodation space is increased, thereby increasing the thickness, weight and power consumption of the module. The advantages of the direct-lit backlight module are good light-emitting angle, high light utilization efficiency, simplified structure, etc.

However, for the liquid crystal display module formed by combining the irregularly-shaped display panel and the backlight module, when the backlight module is an edge-lit module, the single light source placed on the side may enter from the side of the light guide plate. Since the irregularly-shaped display panel has a recessed structure, the recessed structure is also present at the same position for the backlight module, which constitutes the liquid crystal display module with the display panel. Therefore, the light emitted from the light source may form different dark regions and bright regions at the recessed structure, and the display luminance of the backlight module may be uneven, which may cause a decrease in the display quality of the display device.

Therefore, providing a backlight module and a display device, which may enhance the light reflection at the recessed structure of the backlight module, improve the light utilization efficiency and provide uniform light-emitting and luminance by the backlight module, is the technical problem to be solved by those skilled in the art.

SUMMARY

One aspect of the present disclosure provides a backlight module. The backlight module includes: a light-emitting area, a non-light-emitting area surrounding the light-emitting area, at least one notch, a shell, a light source and a light guide plate. The light-emitting area includes a first edge and a second edge. The first edge includes a sub-edge. A remaining portion of the first edge other than the sub-edge extends along a first direction. The second edge extends along a second direction. The sub-edge is recessed toward an inside of the light-emitting area to form the notch. The first direction intersects the second direction. The shell contains an accommodating space to accommodate the light source and the light guide plate. The light source is on at least one side of the light guide plate. A light emitting direction of the light source faces toward the light guide plate. The light source is configured extending along the second direction. The light-emitting area includes at least one compensation area adjacent to the notch, and the compensation area is on a side of the notch away from the light source in the first direction. The light guide plate includes a first portion and a second portion. The first portion is in the compensation area and the second portion is in a non-compensation-area of the light-emitting area. The shell includes a back plate on a side of the light guide plate away from the light emitting surface of the backlight module. A thickness of the first portion is greater than a thickness of the second portion in a direction perpendicular to the back plate. A plurality of protrusions is on a side surface of the first portion facing toward the back plate.

Another aspect of the present disclosure provides a display device. The display device includes a display panel and a backlight module, disposed opposite to each other. The backlight module includes: a light-emitting area, a non-light-emitting area surrounding the light-emitting area, at least one notch, a shell, a light source and a light guide plate. The light-emitting area includes a first edge and a second edge. The first edge includes a sub-edge. A remaining portion of the first edge other than the sub-edge extends along a first direction. The second edge extends along a second direction. The sub-edge is recessed toward an inside of the light-emitting area to form the notch. The first direction intersects the second direction. The shell contains an accommodating space to accommodate the light source and the light guide plate. The light source is on at least one side of the light guide plate. A light emitting direction of the light source faces toward the light guide plate. The light source is configured extending along the second direction. The light-emitting area includes at least one compensation area adjacent to the notch, and the compensation area is on a side of the notch away from the light source in the first direction. The light guide plate includes a first portion and a second portion. The first portion is in the compensation area and the second portion is in a non-compensation-area of the light-emitting area. The shell includes a back plate on a side of the light guide plate away from the light emitting surface of the backlight module. A thickness of the first portion is greater than a thickness of the second portion in a direction perpendicular to the back plate. A plurality of protrusions is on a side surface of the first portion facing toward the back plate.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure. Drawings incorporated in the specification and forming part of the specification demonstrate embodiments of the present disclosure and, together with the specification, describe the principles of the present disclosure.

DETAILED DESCRIPTION

Figure 1:
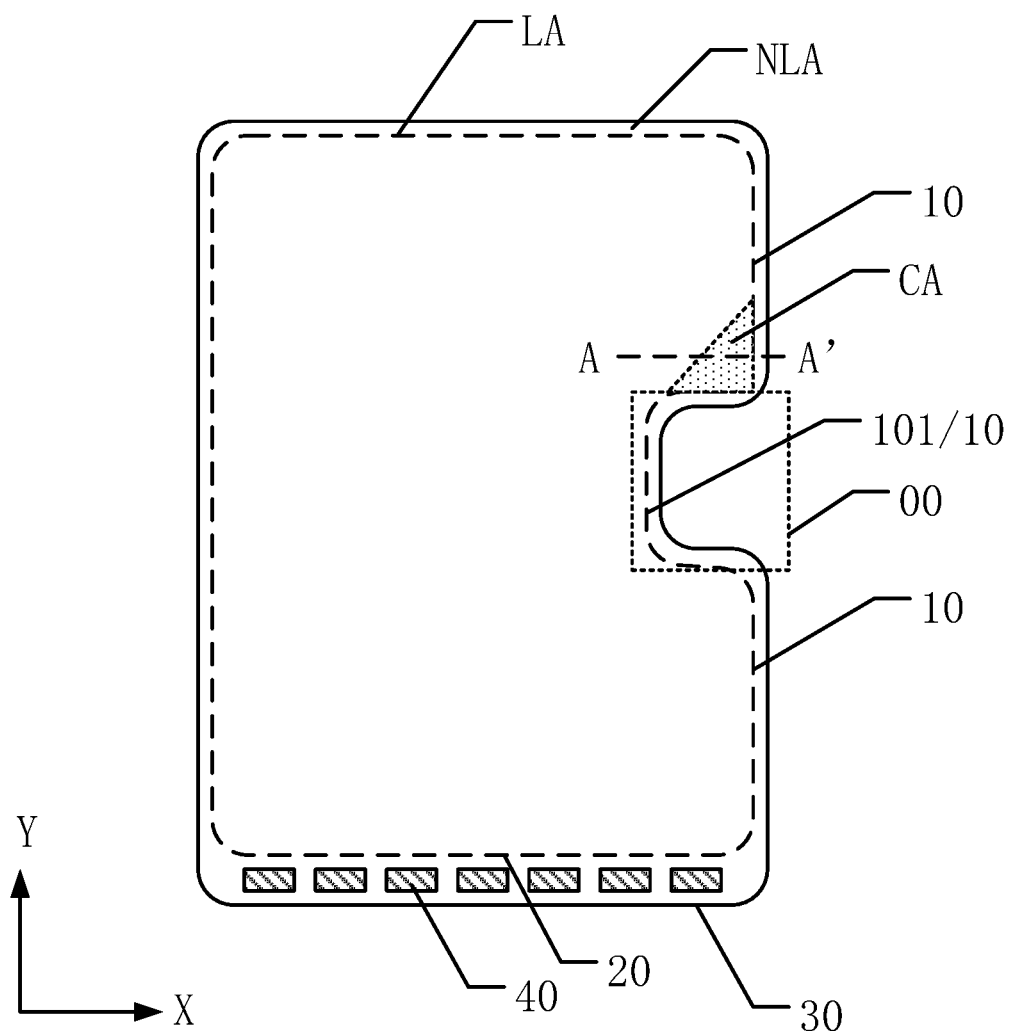
FIG. 1 illustrates a top-view structural schematic of an exemplary backlight module according to embodiments of the present disclosure.

Reference will now be made in detail to exemplary embodiments of the disclosure, which are illustrated in the accompanying drawings. Wherever possible, the same reference numbers will be used throughout the drawings to refer to the same or like parts.

Various exemplary embodiments of the present disclosure will be described in detail with reference to the drawings. It should be noted that the relative arrangements of components and steps, numerical expressions and numerical values set forth in the embodiments are not intended to limit the scope of the present disclosure unless otherwise specified.

The following description of at least one exemplary embodiment is merely illustrative, and not as any limitations on the present disclosure and its application or use.

Techniques, methods and instruments known to those skilled in the art may not be discussed in detail, but where appropriate, the techniques, methods and instruments should be considered as part of the specification.

In all of the examples illustrated and discussed herein, any specific values should be construed as merely illustrative, and not as a limitation. Thus, other examples of the exemplary embodiments may have different values.

It should be noted that similar reference numerals and letters refer to similar items in the following figures, and therefore, once an item is defined in a figure, it is not required to be further discussed in the subsequent figures.

Figure 2:
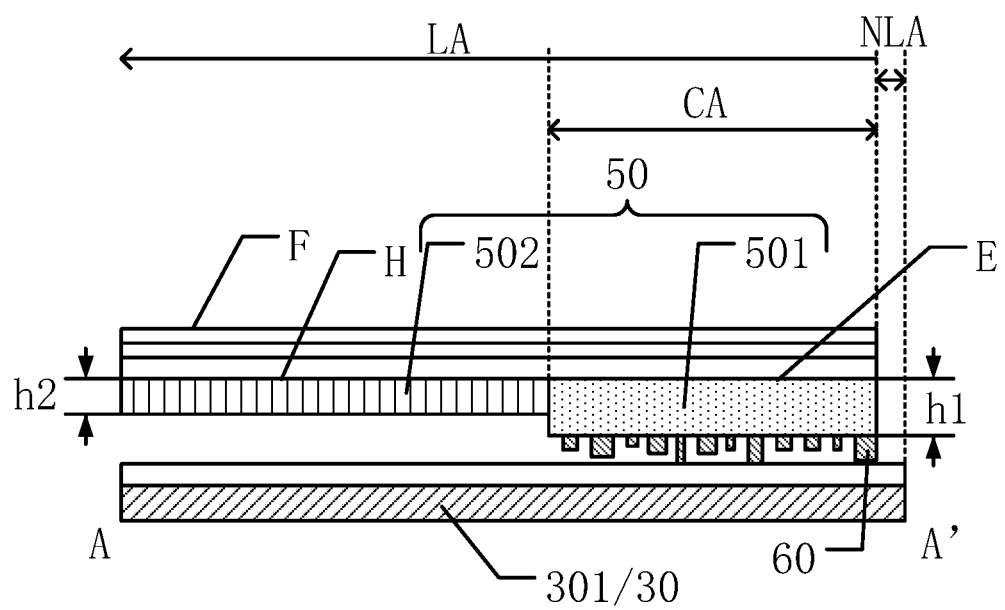
FIG. 2 illustrates a cross-sectional structural schematic along A-A' in FIG. 1.

Referring to FIG. 1 and FIG. 2, FIG. 1 illustrates a top-view structural schematic of an exemplary backlight module according to embodiments of the present disclosure, and FIG. 2 illustrates a cross-sectional structural schematic along the A-A' in FIG. 1. A backlight module provide by one embodiment may include a light-emitting area LA, a non-light-emitting area NLA surrounding the light-emitting area LA, and at least one notch 00.

The light-emitting area LA may include a first edge 10 and a second edge 20. The first edge 10 may include a sub-edge 101, and a remaining portion of the first edge 10 other than the sub-edge 101 may extend along a first direction Y. The second edge 20 may extend along a second direction X. The sub-edge 101 may be recessed toward an inside of the light-emitting area LA to form the notch 00. The first direction Y may intersect the second direction X.

The backlight module may further include a shell 30, such as a bezel, a light source 40, a light guide plate 50, where an accommodating space may be formed in the shell 30 to accommodate the light source 40 and the light guide plate 50.

The light source 40 may be on at least one side of the light guide plate 50, and a light emitting direction of the light source 40 may face toward the light guide plate 50. The light source 40 may be disposed extending along the second direction X. For example, the light guide plate 50 may have four sides, the light source 40 may then be located on at least one of the four sides of the light guide plate 50.

The light-emitting area LA may include at least one compensation area CA which may be adjacent to the notch 00. The compensation area CA may be on a side of the notch 00 away from the light source 40 in the first direction Y.

The light guide plate 50 may include a first portion 501 and a second portion 502. The first portion 501 may be located in the compensation area CA. The second portion 502 may be located in an area of the light-emitting area LA other than the compensation area CA. The second portion 502 may thus be referred to as "non-compensation-area".

The shell 30 may include a back plate 301 on a side of the light guide plate 50 away from the light emitting surface F of the backlight module 111. A thickness h1 of the first portion 501 may be greater than a thickness h2 of the second portion 502 in a direction perpendicular to the back plate 301. A plurality of protrusions 60 may be located on a side surface of the first portion 501 facing toward the back plate 301.

For example, in one embodiment, the backlight module 111 may include the light-emitting area LA, the non-light-emitting area NLA surrounding the light-emitting area LA, and at least one notch 00. The light-emitting area LA may include the first edge 10 and the second edge 20. The first edge 10 may include the sub-edge 101, and the remaining portion of the first edge 10 other than the sub-edge 101 may extend along the first direction Y. The second edge 20 may extend along the second direction X. The first direction Y may intersect the second direction X. Optionally, the first direction Y and the second direction X are perpendicular to each other, that is, the edge of the first edge 10 other than the sub-edge 101 may be disposed to intersect the second edge 20. The sub-edge 101 may be recessed toward the inside of the light-emitting area LA to form the notch 00. The notch 00 may be formed corresponding to the irregularly-shaped display panel, and may be used to place components, such as cameras, earpieces, etc., so the shape design of the irregularly-shaped display panel may avoid the function modules, such as cameras, earpieces, etc., and improve the screen-to-body ratio of the entire display device, which may enable the display effect to be more prominent. The backlight module 111 may further include the shell 30, the light source 40, the light guide plate 50, where the accommodating space may be formed in the shell 30 to accommodate the light source 40 and the light guide plate 50. The light source 40 may be used to provide light of the backlight module 111. The light guide plate 50 may be used to guide the light scattering direction, which may improve the backlight luminance and ensure uniformity of the display luminance. The light source 40 may be located on at least one side of the light guide plate 50, and the light emitting direction of the light source 40 may face toward the light guide plate 50. The light source 40 may be disposed extending along the second direction X. That is, the backlight module 111 provided by one embodiment may be an edge-lit backlight module. The light emitted from the light source 40 may enter from the side of the light guide plate 50. The light guide plate 50 may guide the light scattering direction, which may enable the light-emitting area LA of the backlight module 111 to emit light uniformly, improve the display luminance of the backlight module and enable the luminance to be uniform.

Figure 3:
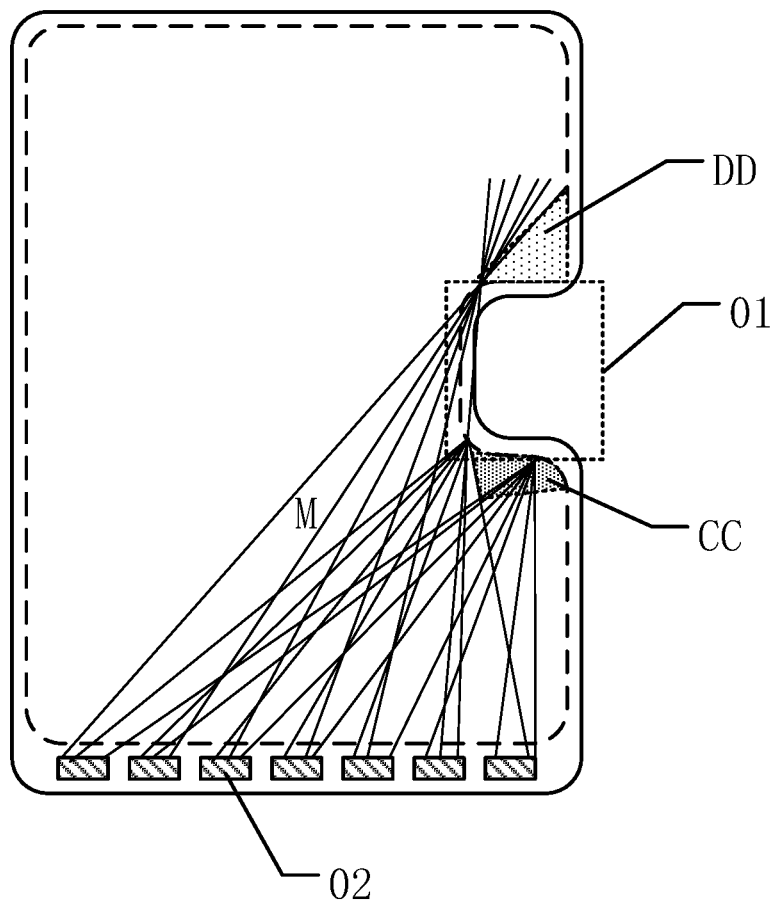
FIG. 3 illustrates a local optical path schematic of an exemplary backlight module according to embodiments of the present disclosure.

Furthermore, referring to FIG. 3, FIG. 3 illustrates a top-view structural schematic of an exemplary backlight module 000. In research processes, the inventors discovered that, due to the presence of a notch 01, the light M emitted from a light source 02 may aggregate on a side of the notch 01 adjacent to the light source 02 to form a bright region CC, and may form a dark region DD on a side of the notch 01 away from the light source 02 due to the inability of the light to enter, thereby causing a low uniformity of the light-emitting luminance of the backlight module 000.

In order to solve the above-mentioned problems, referring to FIG. 1 and FIG. 2, in one embodiment, at least one compensation area CA (the dark region DD in FIG. 3) may be disposed in the light-emitting area LA. The compensation area CA may be adjacent to the notch 00 and may be on the side of the notch 00 away from the light source 40 in the first direction Y. The light guide plate 50 may be configured as two portions which are the first portion 501 and the second portion 502. The first portion 501 may be in the compensation area CA and the second portion 502 may be in the area of the light-emitting area LA other than the compensation area CA. The shell 30 may include the back plate 301 (optionally, the shell 30 may further include a plastic/iron frame, not shown). The back plate 301 may be on the side of the light guide plate 50 away from the light emitting surface F of the backlight module 111. The thickness h1 of the first portion 501 may be greater than the thickness h2 of the second portion 502 in a direction perpendicular to the back plate 301. The plurality of protrusions 60 may be located on the side surface of the first portion 501 facing toward the back plate 301. That is, the light guide plate 50 corresponding to the compensation area CA may perform a thickening treatment in the direction perpendicular to the back plate 301, thereby be more advantageous for the aggregation and transmission of the light emitted from the light source 40 at the first portion 501 and increasing the light utilization efficiency of the compensation area CA. In one embodiment, the plurality of protrusions 60 facing toward the side of the back plate 301 may be disposed at the thickened position of the light guide plate 50, which may enable the incident light on the positions of the protrusions 60 to be more uniformly reflected, and enable the light in the range of the compensation area CA to be uniform, thereby improving the luminance uniformity, light-emitting effect and light-emitting quality of the backlight module 111.

It should be noted, the size and shape of the compensation area CA may not be specifically limited in various embodiments of the present disclosure, and may be calculated differently in the complementation according to the incident light intensity, incident light direction and reflected light direction of the light source 40 and the size of the notch 00. When a thickening treatment is not performed on the light guide plate 50, it may only need to be satisfied that the luminance of the backlight module 111 in the compensation area CA may be darker than other areas, which may not be specifically limited in various embodiments of the present disclosure. The difference between the thickness of the first portion 501 and the second portion 502 in the direction perpendicular to the back plate 301 may not be specifically limited in various embodiments of the present disclosure and may be calculated in the complementation according to actual situations. It may only need to be satisfied that the thickening treatment on the first portion 501 may increase the light utilization efficiency of the compensation area CA and improve the light-emitting luminance in the compensation area CA.

It should be noted that, in one embodiment, the backlight module 111 may include the plurality of the notches 00. In the above-mentioned description, only one notch 00 may be used as an example to illustrate the working principle and beneficial effects in the embodiments of the present disclosure. Those skilled in the art should understand that, for the backlight module 111 having more than one notch 00, in one embodiment, the same structure may be disposed to achieve the same or similar technical effects in the embodiments of the present disclosure, which may not be described in detail herein. In order to clearly illustrate the technical effects of the backlight module, only a portion of the structure may be labeled in FIG. 2. Other structures (e.g., other optical films: a reflector, a diffuser plate, a prism sheet, etc.) and structures in the non-light-emitting area NLA, which are not described in the technical solution in one embodiment, may not be labeled and shown, and those skilled in the art may understand the related structures in combination with the basic structures of the backlight modules in the prior art.

Figure 4:
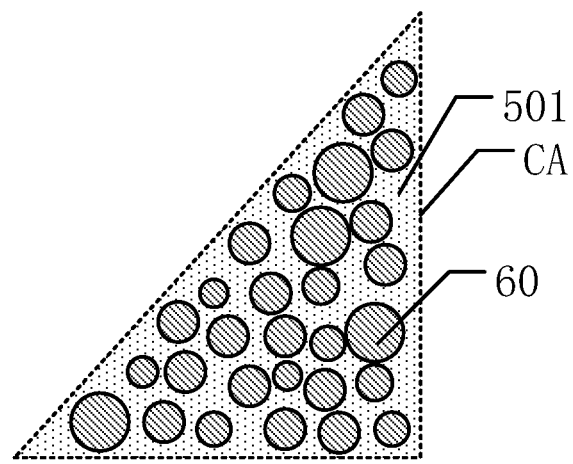
FIG. 4 illustrates an enlarged schematic of a compensation region CA in FIG. 1.

Optionally, referring to FIG. 1, FIG. 2, and FIG. 4, FIG. 4 illustrates an enlarged schematic of a compensation region CA in FIG. 1. Heights of the plurality of the protrusions 60 may be different in a direction perpendicular to the back plate 301, and outer diameters of the plurality of the protrusions 60 may be different in a direction in parallel with the back plate 301.

In one embodiment, it may further illustrate that the heights of the plurality of the protrusions 60 may be different in the direction perpendicular to the back plate 301 and the outer diameters of the plurality of the protrusions 60 may be different in the direction in parallel with the back plate 301, that is, the shapes, heights, sizes of the plurality of the protrusions 60 disposed on the surface side of the first portion 501 facing toward the back plate 301 may not be specifically limited according to various embodiments of the present disclosure. In addition, the arrangement of the protrusions 60 in the compensation area CA may not be specifically limited according to various embodiments of the present disclosure, that is, the cross-sectional shapes of the protrusions 60 in parallel with the light-emitting surface F of the backlight module may be any shapes, such as squares, circles, triangles, etc.; the heights of the protrusions 60 in the direction perpendicular to the back plate 301 may also be different; and the cross-sectional outer diameters of the protrusions 60 in parallel with the light-emitting surface F of the backlight module may also be different. Therefore, the light transmission may be improved, and the light may be uniformly scattered by each protrusion 60, which may enable to have uniform light, solve the shadow phenomenon in the compensation area CA, and improve the light-emitting luminance of the compensation area CA. In FIG. 4 of one embodiment, the compensation area CA may be triangular and the protrusions 60 may be cylindrical in for illustrative description. The shapes of the compensation area CA and the protrusions 60 may not be limited to the above-mentioned shapes according to various embodiments of the present disclosure and may be any other shapes, which may not be described in detail herein.

It should be noted that, in one embodiment, the protrusions 60 and the light guide plate 50 may be integrally formed. Since the light guide plate 50 is very thin, the heights of the protrusions 60 may be relatively small and the integral formation may be advantageous for reducing the process difficulty and improving the manufacturing efficiency.

In some optional embodiments, referring to FIG. 1 and FIG. 2, an orthographic projection of the compensation area CA on the back plate 301 may overlap an orthographic projection of the first portion 501 on the back plate 301.

In one embodiment, it may further define that the orthographic projection of the compensation area CA on the back plate 301 may overlap the orthographic projection of the first portion 501 on the back plate 301, so the area and shape of the compensation area CA and the first portion 501 of the light guide plate 50 where the thickening treatment may be performed may be consistent. Therefore, the backlight luminance in the range of the compensation area CA may be improved and the shadow problem in the compensation area may be solved, which may improve the luminance uniformity of the entire backlight module.

In some optional embodiments, referring to FIG. 2, the surfaces of the first portion 501 and the second portion 502 away from the back plate 301 may be located on a same plane.

In one embodiment, it may further illustrate that a surface E on the side of the first portion 501 away from the back plate 301 and a surface H on the side of the second portion 502 away from the back plate 301 may be located on a same plane, that is, a surface at the thicken position of the light guide plate 50 may be a side surface facing toward the back plate 301. Since the light-emitting surface of the light guide plate 50 is on the side away from the back plate 301, the thickening treatment may be performed on the light guide plate 50 on the side facing toward the back plate 301, which may enable the first portion 501 of the light guide plate 50 to protrude downward with respect to the second portion 502. Therefore, the light incident from the light source 40 to the downward protruding structure of the first portion 501 may be uniformly scattered and then guided from the light-emitting surface of the light guide plate 50, thereby improving the light-emitting luminance of the compensation area CA which make uniform luminance of the backlight module.

Figure 5:
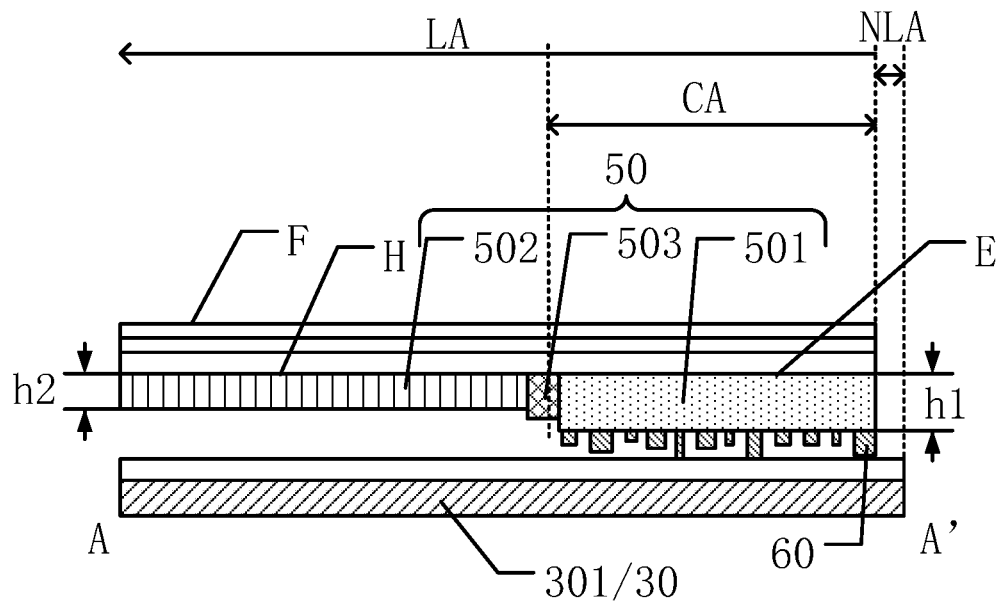
FIG. 5 illustrates another cross-sectional structural schematic along A-A' in FIG. 1.

In some optional embodiments, referring to FIG. 5, FIG. 5 illustrates another cross-sectional structural schematic along A-A' in FIG. 1. In one embodiment, the light guide plate 50 may further include a connecting portion 503 which may be located between the first portion 501 and the second portion 502. The surfaces of the first portion 501, the connecting portion 503 and the second portion 502 on the side away from the back plate 301 may be located on a same plane.

In one embodiment, it may further illustrate that the light guide plate 50 may further include the connecting portion 503 between the first portion 501 and the second portion 502. The thickness h1 of the first portion 501 may be greater than the thickness h2 of the second portion 502 in the direction perpendicular to the back plate 301, and there may be a step difference between the surface on the side of the first portion 501 adjacent to the back plate 301 and the surface on the side of the second portion 502 adjacent to the back plate 301. Therefore, disposing the connecting portion 503 between the first portion 501 and the second portion 502 may provide a better transition, which may enable a smoother connection between the surface on the side of the first portion 501 adjacent to the back plate 301 and the surface on the side of the second portion 502 adjacent to the back plate 301.

Figure 6:
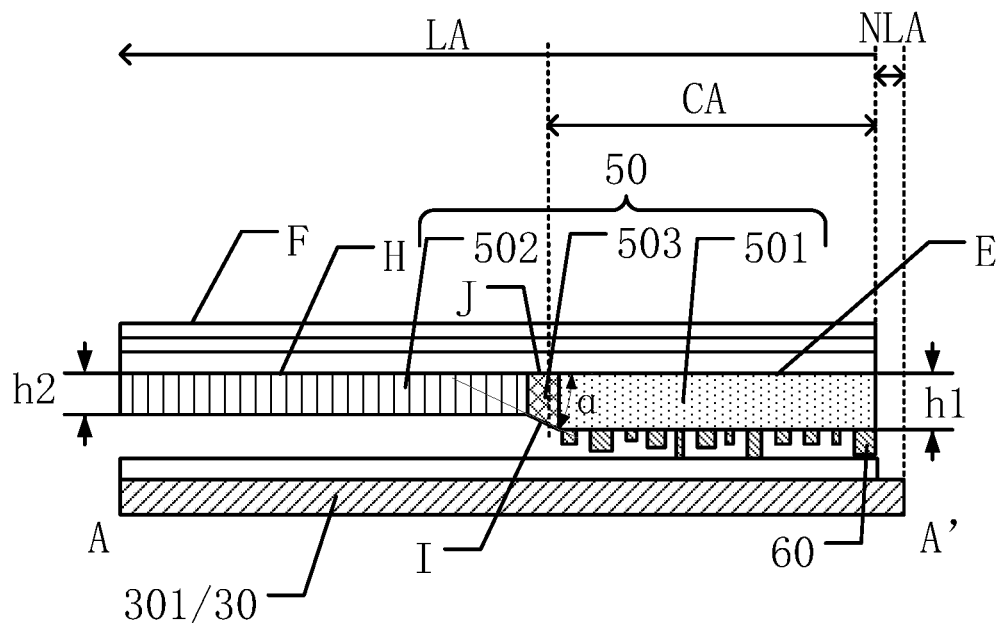
FIG. 6 illustrates another cross-sectional structural schematic along A-A' in FIG. 1.

In some optional embodiments, referring to FIG. 6, FIG. 6 illustrates another cross-sectional structural schematic along A-A' in FIG. 1. In one embodiment, a surface of the connecting portion 503 adjacent to the back plate 301 may be a first surface I and a surface of the connecting portion 503 away from the back plate 301 may be a second surface J, where an acute angle α may be formed between the first surface I and the second surface J.

In one embodiment, it may further define that the surface of the connecting portion 503 adjacent to the back plate 301 may be the first surface I and the surface of the connecting portion 503 away from the back plate 301 may be the second surface J, where the acute angle a may be formed between the first surface I and the second surface J. That is, the second surface J of the connecting portion 503, the surface E on the side of the first portion 501 away from the back plate 301 and the surface H on the side of the second portion 502 away from the back plate 301 may be located on a same plane; and the first surface I of the connecting portion 503 may form a slope between the first portion 501 and the second portion 502 adjacent to the back plate 301, which may further improve transition effect and enable a smoother connection between the surfaces of the first portion 501 and the second portion 502 adjacent to the back plate 301. Moreover, the slope structure may avoid the damage of film layers (e.g., a reflector) between the back plate 301 and the light guide plate 50 due to a sharp angle generated by the thickness difference at the connection between the first portion 501 and the second portion 502, thereby avoiding affecting the light-emitting effect and quality of the backlight module.

Optionally, the acute angle α formed between the first surface I and the second surface J may be in a range of about 5-30 degrees. In order to have a smooth connection between the connecting portion 503 and each edge of the first portion 501 and the second portion 502, the thickness of the connecting portion 503 adjacent to the first portion 501 may be same as the thickness h1 of the first portion 501, and the thickness of the connecting portion 503 adjacent to the second portion 502 may be same as the thickness h2 of the second portion 502. If α is less than 5 degrees, the slope of the connecting portion 503 may be too gentle, which may not guarantee the thickness difference between the first portion 501 and the second portion 502, that is, the first portion 501 may not have an effective thickening treatment. If α is larger than 30 degrees, the slope of the connecting portion 503 may be too steep, which may make the thickness of the first portion 501 too thick and may not achieve a better uniform light scattering effect. Moreover, the very steep slope of the connecting portion 503 may generate a certain sharp angle between the first portion 501 and the second portion 502, which may cause certain effect on film layers (e.g., a reflector) between the back plate 301 and the light guide plate 50, thereby affecting the light-emitting effect and quality of the backlight module. Therefore, optionally, the range of the formed acute angle α between the first surface I and the second surface J may be defined to 5 to 30 degrees in one embodiment. The connecting portion 503 with above-mentioned range of the acute angle may better smooth the connection of the surfaces of the first portion 501 and the second portion 502 on the side adjacent to the back plate 301, and may also avoid affecting the light-emitting effect and quality of the backlight module.

It should be noted that the connecting method of the first portion 501, the connecting portion 503 and the second portion 502 may not be specifically limited according to various embodiments of the present disclosure. Optionally, the first portion 501, the connecting portion 503 and the second portion 502 may be integrally formed, thereby reducing the process difficulty and improving the assembly efficiency of the backlight module. The connecting method may be selected according to actual situations, which may not be described in detail in one embodiment.

Figure 7:
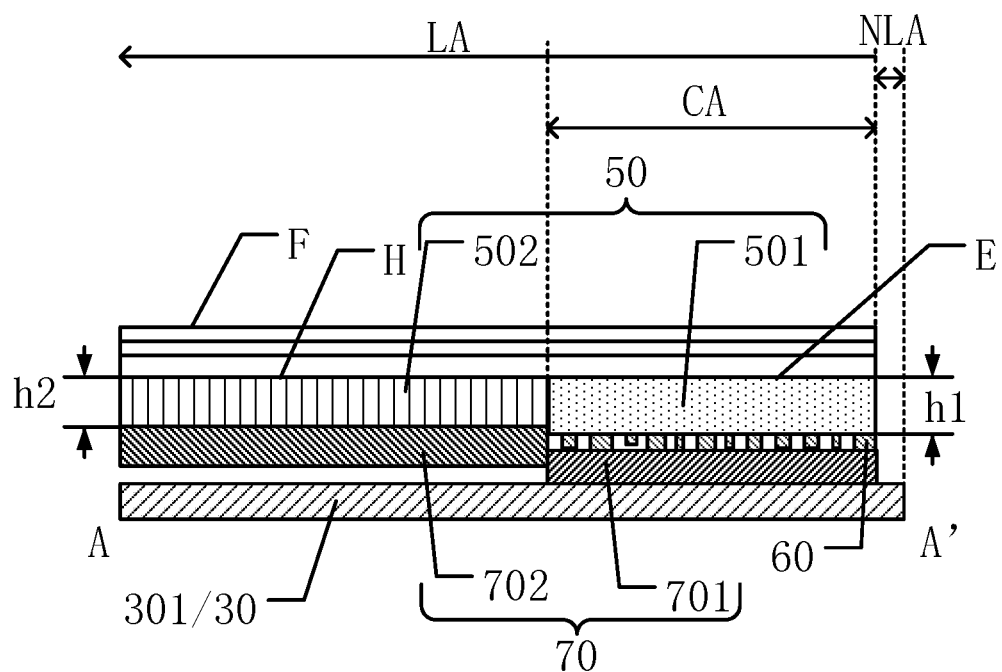
FIG. 7 illustrates another cross-sectional structural schematic along A-A' in FIG. 1.

In some optional embodiments, referring to FIG. 7, FIG. 7 illustrates another cross-sectional structural schematic along A-A' in FIG. 1. In one embodiment, a reflector 70 may be further included. The reflector 70 may be located between the back plate 301 and the light guide plate 50, and may be attached to the light guide plate 50.

In one embodiment, it may further illustrate that the reflector 70 may be between the back plate 301 and the light guide plate 50, and may be used to reflect partial light projected onto the back plate 301 from the light source 40 back to the light guide plate 50, which may reflect the light to the surface of the light guide plate 50 as efficiently as possible, thereby improving the light utilization efficiency and achieving a better light-emitting effect of the backlight module. It should be noted that the reflector 70 may use transparent PET (polyethylene terephthalate) as a substrate, printed or laminated with a white reflective layer or a silver-plated reflective layer, and the PET protective films may be attached to both sides of the reflector 70. However, this type of fabrication may not be limited according to various embodiments of the present disclosure, and may be other reflectors 70, which may not be described in detail in one embodiment.

In some optional embodiments, referring to FIG. 7, the reflector 70 may at least include a third portion 701 and a fourth portion 702. The third portion 701 may be attached to the first portion 501 of the light guide plate 50 and the fourth portion 702 may be attached to the second portion 502 of the light guide plate 50.

In one embodiment, it may further define that the reflector 70 may at least include the third portion 701 and the fourth portion 702. Moreover, in order to attach the third portion 701 to the first portion 501 of the light guide plate 50 and attach the fourth portion 702 to the second portion 502 of the light guide plate 50, so a certain step difference may be present at the connection between the third portion 701 and the fourth portion 702 of the reflector 70 correspondingly. Therefore, when the light source 40 projects light onto the back plate 301 at the position of the first portion 501 of the light guide plate 50, the partial light may be reflected back into the light guide plate 50 through the third portion 701; and when the light source 40 projects light onto the back plate 301 at the position of the second portion 502 of the light guide plate 50, the partial light may be reflected back into the light guide plate 50 through the fourth portion 702. That is, the light reflection capability of the reflector 70 may be further enhanced and the light utilization efficiency may be improved, which may enable the backlight module to achieve a better light-emitting effect.

It should be noted that, in one embodiment, in order to more clearly illustrate the technical solution, the thickness of the light guide plate 50 and the reflector 70 and the heights of the protrusions 60 may be enlarged in FIG. 7. Those skilled in the art should know that both the light guide plate 50 and the reflector 70 may be very thin optical films and the heights of the protrusions 60 may also be very small. Therefore, when attaching the third portion 701 of the reflector 70 to the first portion 501 of the light guide plate 50 and attaching the fourth portion 702 of the reflector 70 to the second portion 502 of the light guide plate 50, the attaching effect between the third portion 701 of the reflector 70 and the first portion 501 of the light guide plate 50 may not affected by the heights of the protrusions 60.

Figure 8:
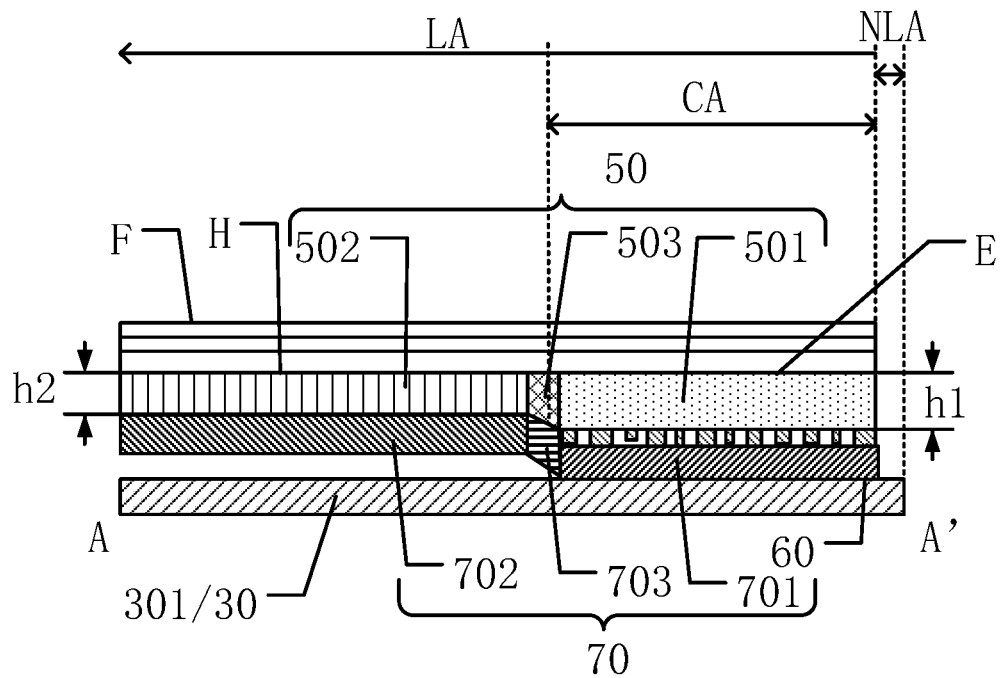
FIG. 8 illustrates another cross-sectional structural schematic along A-A' in FIG. 1.

In some optional embodiments, referring to FIG. 8, FIG. 8 illustrates another cross-sectional structural schematic along A-A' in FIG. 1. In one embodiment, the third portion 701 and the fourth portion 702 may be fixedly connected by a first connecting portion 703. One end of the first connecting portion 703 may be fixedly connected to the third portion 701 and the other end of the first connecting portion 703 may be fixedly connected to the fourth portion 702.

In one embodiment, it may further illustrate that the reflector 70 may further include the first connecting portion 703 between the third portion 701 and the fourth portion 702. Since the third portion 701 may be attached to the first portion 501 of the light guide plate 50 and the fourth portion 702 may be attached to the second portion 502 of the light guide plate 50, a certain step difference may be present at the connection between the third portion 701 and the fourth portion 702 of the reflector 70 correspondingly. Therefore, the first connecting portion 703 may be disposed between the third portion 701 and the fourth portion 702. Optionally, the first connecting portion 703 may be attached to the connecting portion 503 of the light guide plate 50, which may enable a better transition and smooth connection between the third portion 701 and the fourth portion 702. Moreover, when the light source 40 projects light onto the back plate 301 at the position of the connecting portion 503 of the light guide plate 50, the partial light may be reflected back into the light guide plate 50 through the first connecting portion 703, so the light reflection capability of the reflector 70 may be further enhanced and the light utilization efficiency may be improved, which may enable the backlight module to achieve a better light-emitting effect.

Figure 9:
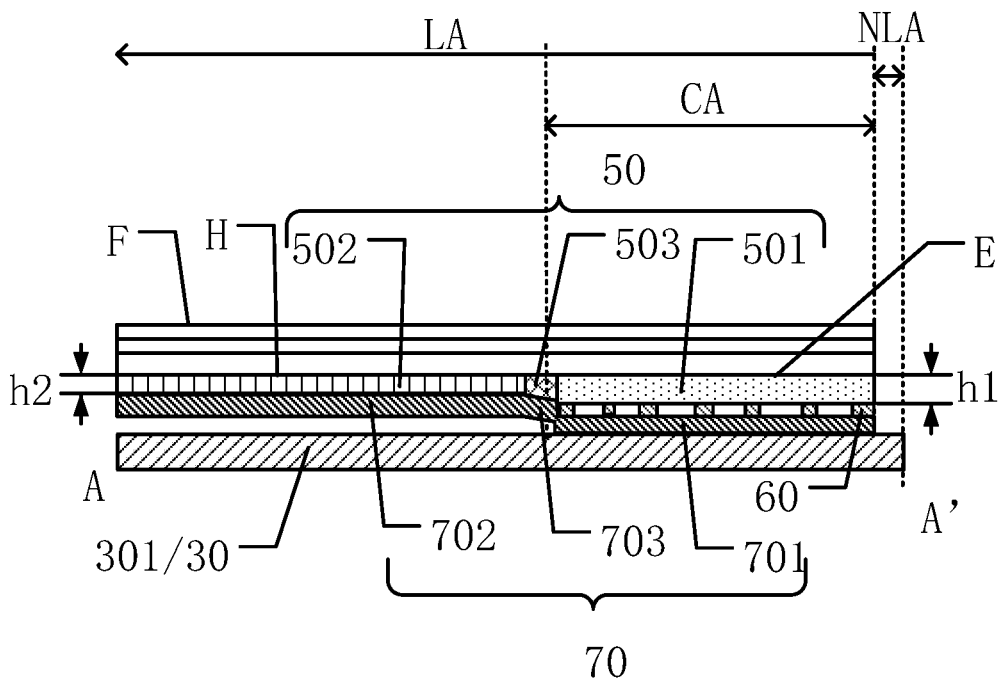
FIG. 9 illustrates another cross-sectional structural schematic along A-A' in FIG. 1.

In some optional embodiments, referring to FIG. 9, FIG. 9 illustrates another cross-sectional structural schematic along A-A' in FIG. 1. In one embodiment, the third portion 701 and the fourth portion 702 may be integrally formed.

In one embodiment, it may further define that the third portion 701 and the fourth portion 702 of the reflector 70 may be integrally formed. Therefore, the integrally formed structure of the reflector 70 may be entirely assembled into the backlight module, which may enhance the light reflection capability of the reflector 70 and may also improve the assembly efficiency of the backlight module, thereby reducing the process difficulty and saving costs.

Figure 10:
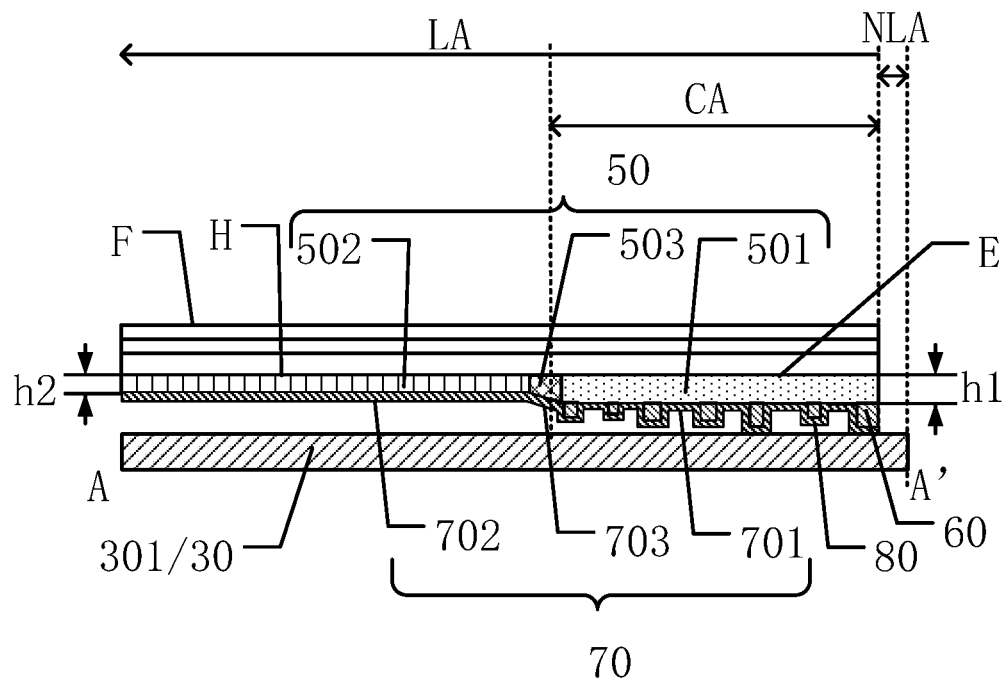
FIG. 10 illustrates another cross-sectional structural schematic along A-A' in FIG. 1.

In some optional embodiments, referring to FIG. 10, FIG. 10 illustrates another cross-sectional structural schematic along A-A' in FIG. 1. In one embodiment, the third portion 701 may include a plurality of recessed portions 80 which may be recessed toward a direction perpendicular to the back plate 301. An orthographic projection of the recessed portions 80 on the back plate 301 may overlap an orthographic projection of the protrusions 60 on the back plate 301.

In one embodiment, it may further define that, when the third portion 701 and the fourth portion 702 are integrally formed, a plurality of the protrusions 60 having different heights, outer diameters and shapes may be disposed on the side of the first portion 501 adjacent to the back plate 301. Therefore, in order to enhance the light utilization efficiency of the reflector 70 at the corresponding position of the protrusions 60, the plurality of recessed portions 80, which may be recessed toward the back plate 301 in the direction perpendicular to the back plate 301, may be disposed on the third portion 701 of the reflector 70, and the orthographic projection of the recessed portions 80 on the back plate 301 may overlap the orthographic projection of the protrusions 60 on the back plate 301, that is, the protrusions 60 may be embedded in the recessed portions 80 of the reflector 70. In such way, the reflector 70 may be attached to the light guide plate 50 completely, which may avoid the situation that the third portion 701 of the reflector and the first portion 501 of the light guide plate 50 may not attach well due to certain heights of the protrusions 60 in the direction perpendicular to the back plate 301. Moreover, the light projected on the protrusions 60 from the light source 40 may be reflected back into the light guide plate 50 through the recessed portions 80 of the reflector 70, so the light utilization efficiency may be further increased, the light-emitting luminance of the backlight module in the compensation area CA may be improved, and the shadow problem in the area may be solved, thereby further improving the light-emitting quality and effect of the backlight module.

Figure 11:
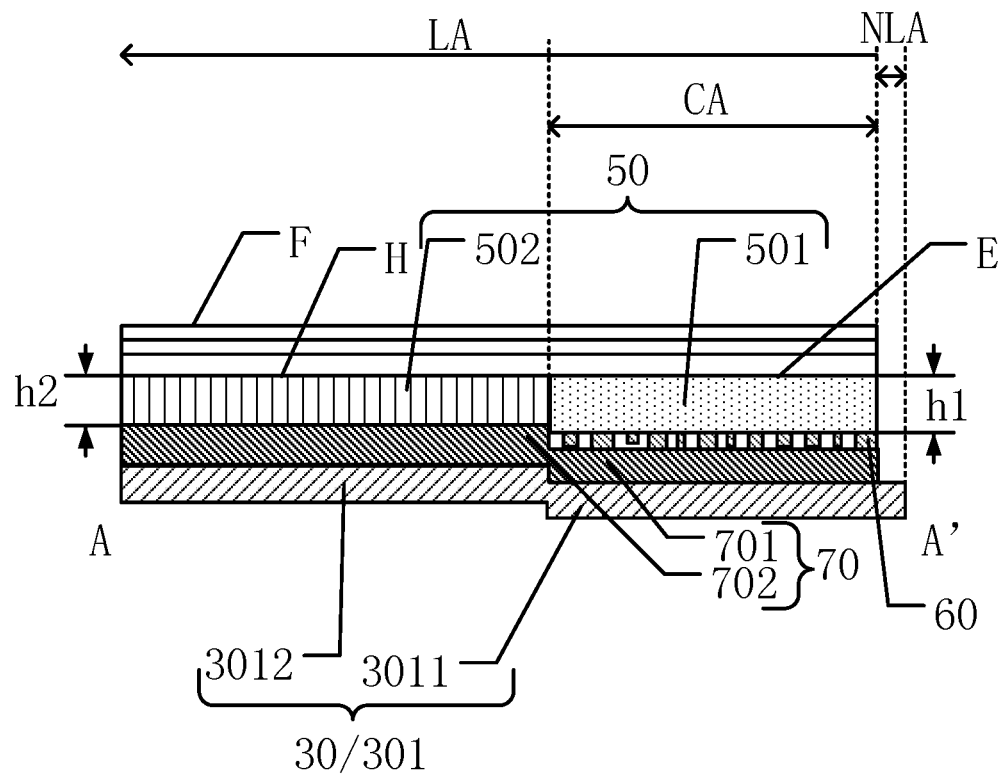
FIG. 11 illustrates another cross-sectional structural schematic along A-A' in FIG. 1.

In some optional embodiments, referring to FIG. 11, FIG. 11 illustrates another cross-sectional structural schematic along A-A' in FIG. 1. In one embodiment, the back plate 301 may at least include a fifth portion 3011 and a sixth portion 3012 which may not on a same plane. An orthographic projection of the fifth portion 3011 on the light guide plate 50 may overlap the first portion 501 and an orthographic projection of the sixth portion 3012 on the light guide plate 50 may overlap the second portion 502.

In one embodiment, it may further illustrate that the back plate 301 may at least include the fifth portion 3011 and the sixth portion 3012 which may not on the same plane. The orthographic projection of the fifth portion 3011 toward the light guide plate 50 may overlap the first portion 501 and the orthographic projection of the sixth portion 3012 toward the light guide plate 50 may overlap the second portion 502. The reflector 70 may be disposed between the back plate 301 and the light guide plate 50 to improve the light utilization efficiency, and a certain step difference may be present at the connection of the third portion 701 and the fourth portion 702 of the reflector 70. Therefore, in order to attach the fourth portion 702 of the reflector 70 to the sixth portion 3012 of the back plate 301 and avoid causing the reflector 70 to be unsupported in the shell 30 due to the presence of a gap, the back plate 301 may be designed to at least include the fifth portion 3011 and the sixth portion 3012 which may not on the same plane in one embodiment. In such way, the fifth portion 3011 may bear the third portion 701 of the reflector 70 and the first portion 501 of the light guide plate 50, and the sixth portion 3012 may bear the fourth portion 702 of the reflector 70 and the second portion 502 of the light guide plate 50, which may avoid poor light-emitting caused by the shell 30 which may not bear and support the components of the backlight module.

Figure 12:
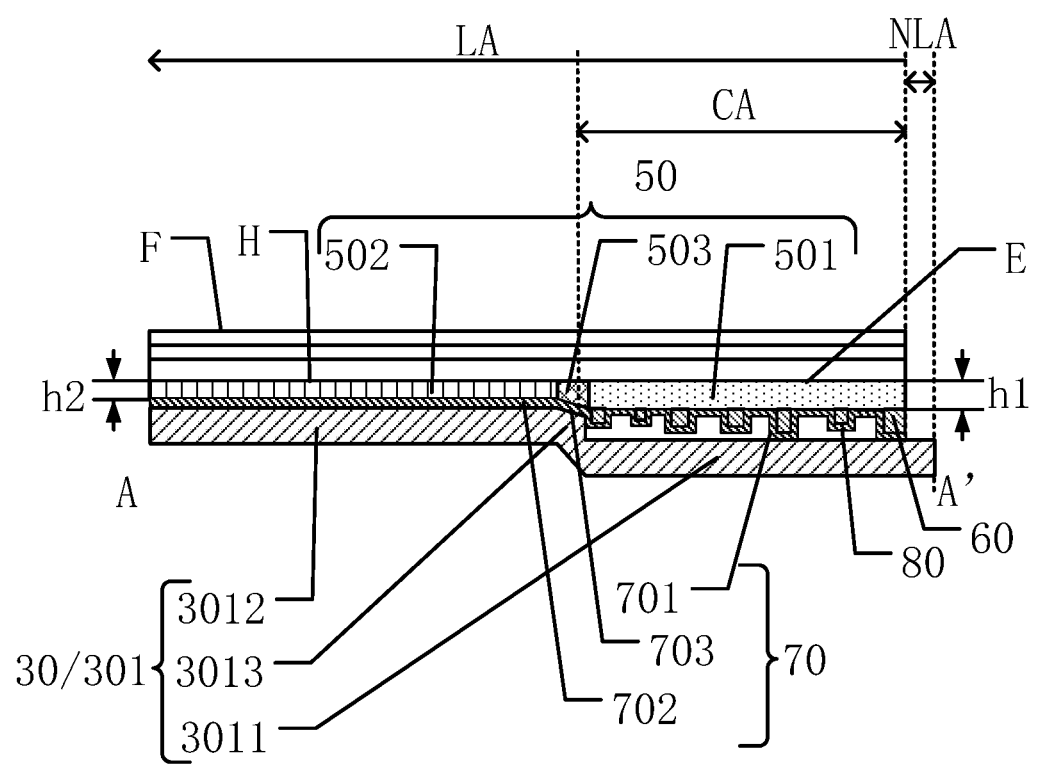
FIG. 12 illustrates another cross-sectional structural schematic along A-A' in FIG. 1.

In some optional embodiments, referring to FIG. 12, FIG. 12 illustrates another cross-sectional structural schematic along A-A' in FIG. 1. In one embodiment, the fifth portion 3011 and the sixth portion 3012 may be fixedly connected through a second connecting portion 3013. One end of the second connecting portion 3013 may be fixedly connected to the fifth portion 3011 and the other end of the second connecting portion 3013 may be fixedly connected to the sixth portion 3012.

In one embodiment, it may further illustrate that the back plate 301 may further include the second connecting portion 3013 between the fifth portion 3011 and the sixth portion 3012. The reflector 70 may be disposed between the back plate 301 and the light guide plate 50 to improve the light utilization efficiency, and a certain step difference may be present at the connection of the third portion 701 and the fourth portion 701. Therefore, when the fifth portion 3011 and the sixth portion 3012 of the back plate 301 bear and support the third portion 701 and the fourth portion 702 of the reflector 70, a certain step difference may also be present at the connection of the fifth portion 3011 and the sixth portion 3012, so the fifth portion 3011 and the sixth portion 3012 may be fixedly connected by the second connecting portion 3013. Optionally, the second connecting portion 3013 may be attached to the first connecting portion 703 of the reflector 70, which may enable a better transition and smooth connection between the fifth portion 3011 and the sixth portion 3012 of the back plate 301.

Figure 13:
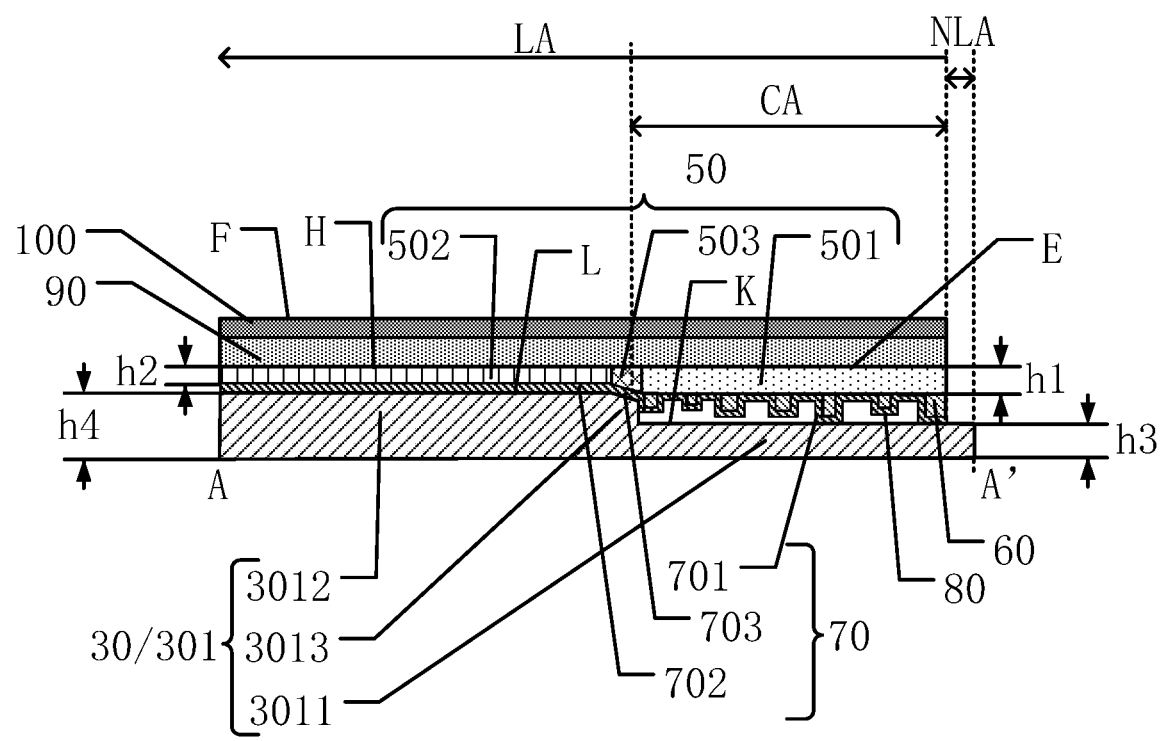
FIG. 13 illustrates another cross-sectional structural schematic along A-A' in FIG. 1.
Figure 14:
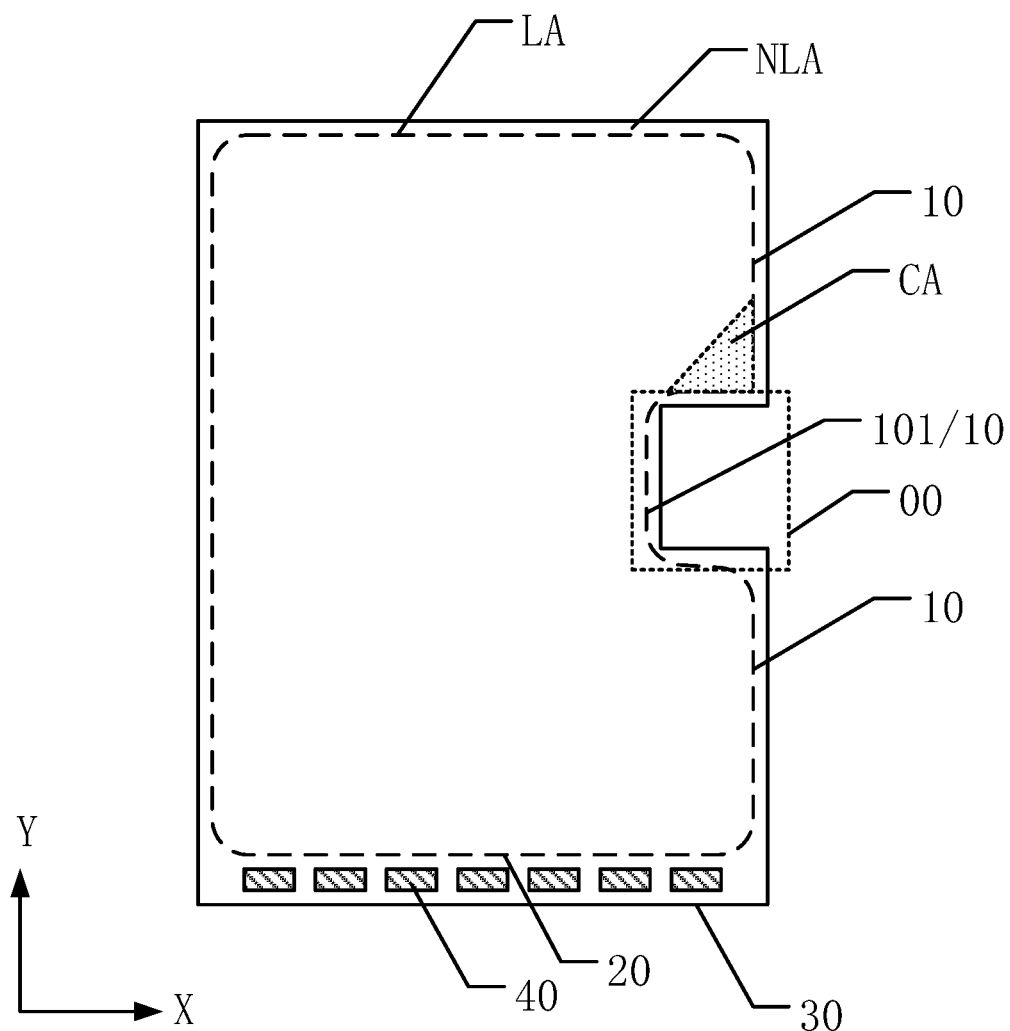
FIG. 14 illustrates a top-view structural schematic of another exemplary backlight module according to embodiments of the present disclosure.

Optionally, referring to FIG. 13, FIG. 13 illustrates another cross-sectional structural schematic along A-A' in FIG. 1. In one embodiment, a surface K on the side of the fifth portion 3011 of the back plate 301 adjacent to the reflector 70 and a surface L on the side of the sixth portion 3012 of the back plate 301 adjacent to the reflector 70 may not be on a same plane. However, in order to enable the entire shell 301 being stable, the surfaces of the fifth portion 3011 and the sixth portion 3012 of the back plate 301 away from the reflector 70 may be configured on a same plane, that is, a thickness h3 of the fifth portion 3011 may be less than a thickness h4 of the sixth portion 3012, which may achieve a better light-emitting effect by the backlight module and also ensure the stability of the backlight module.

In some optional embodiments, referring to FIG. 12 and FIG. 13, the fifth portion 3011 and the sixth portion 3012 may be integrally formed.

In one embodiment, it may further define that the fifth portion 3011 and the sixth portion 3012 of the back plate 301 may be integrally formed. Therefore, the integrally formed structure of the back plate 301 may be entirely assembled into the backlight module, which may provide a bearing space to other components of the backlight module and also improve the assembly efficiency of the backlight module, thereby reducing the process difficulty and saving costs.

In some optional embodiments, referring to FIG. 13, a diffuser plate 90 and a brightness enhancement film 100 may be stacked one over another on a side of the light guide plate 50 away from the back plate 301.

In one embodiment, it may further illustrate that the diffuser plate 90 and the brightness enhancement film 100 may be stacked one over another on the side of the light guide plate 50 away from the back plate 301. The diffuser plate 90 may utilize PMMA (polymethyl methacrylate) diffusing particles to enable light to be refracted randomly and to generate efficient homogenization of the emitting light from the light source. According to the haze value of the diffusing particles, the diffuser plate 90 may be separated into an upper diffuser plate and a lower diffuser plate (not shown), which may have the same basic structures, both have antistatic properties. Additionally, the lower diffuser plate may have an anti-attaching function. The brightness enhancement film 100 may enable the final light emitted from the light source to be emitted toward the light-emitting surface F in a direction perpendicular to the light-emitting surface F of the backlight module.

It should be noted that, in one embodiment, the structures included in the optical films of the backlight module may be exemplary only, but it may not be limited to the above-mentioned structure according to various embodiments of the present disclosure. In actual production processes, other structures of the optical films, which may achieve same or similar effects, may be designed according to different requirements, which may not be described in detail herein.

Figure 15:
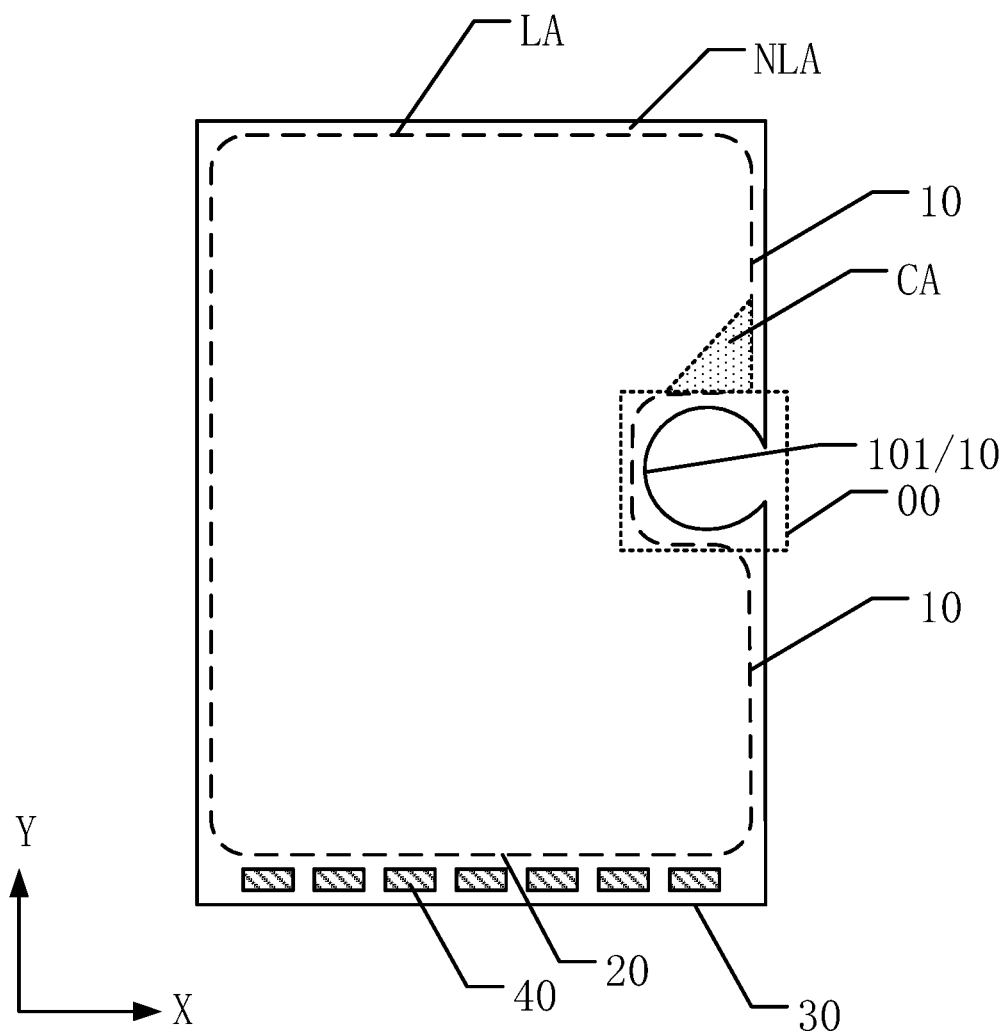
FIG. 15 illustrates a top-view structural schematic of another exemplary backlight module according to embodiments of the present disclosure.
Figure 16:
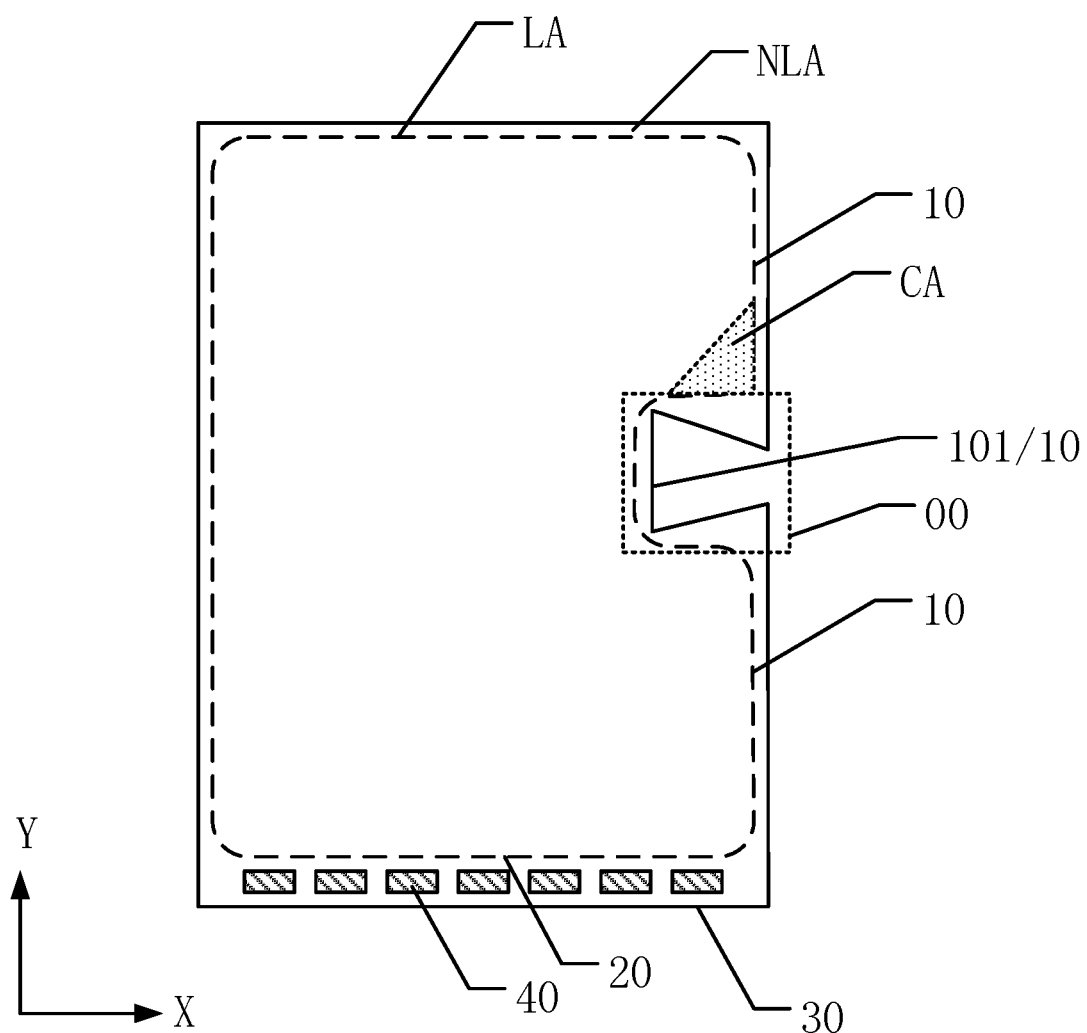
FIG. 16 illustrates a top-view structural schematic of another exemplary backlight module according to embodiments of the present disclosure.

In some optional embodiments, referring to FIG. 1, FIG. 14, FIG. 15 and FIG. 16, FIG. 14 illustrates a top-view structural schematic of another exemplary backlight module according to embodiments of the present disclosure; FIG. 15 illustrates a top-view structural schematic of another exemplary backlight module according to embodiments of the present disclosure; and FIG. 16 illustrates a top-view structural schematic of another exemplary backlight module according to embodiments of the present disclosure. In one embodiment, the shape of the notch 00 may include any one of a rectangle, a rounded rectangle, a circle, a trapezoid, or any other suitable shapes.

In one embodiment, it may further exemplify the shape of the notch 00, that is, the formed shape of the sub-edge 101 recessed toward the light-emitting area LA. The shape of the notch 00 may be a rectangle (FIG. 14), a rounded rectangle (FIG. 1), a circle (FIG. 15), a trapezoid (FIG. 16), or any other suitable shapes. The shape of the notch 00 may be designed according to product requirements, which may not be specifically limited according to various embodiments of the present disclosure.

Figure 17:
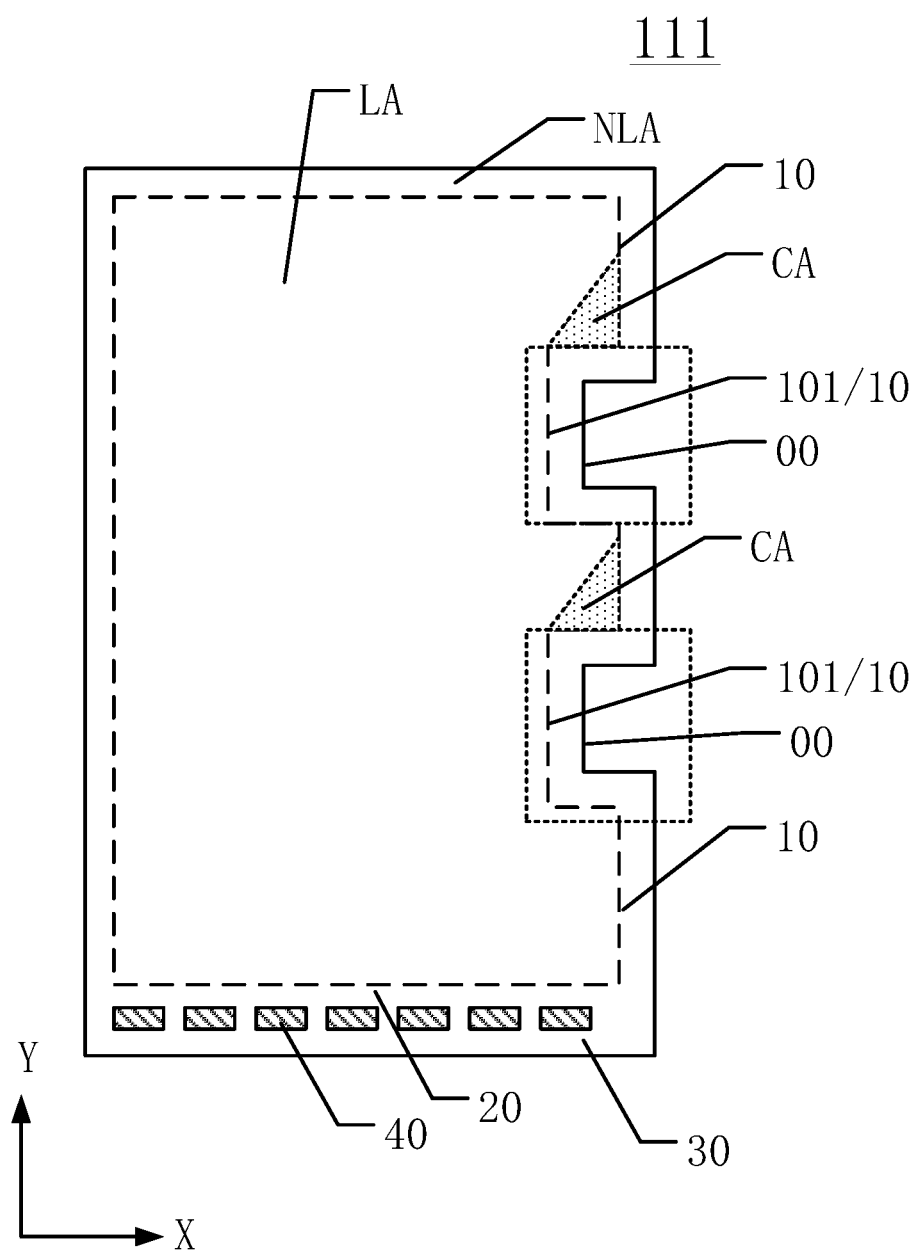
FIG. 17 illustrates a top-view structural schematic of another exemplary backlight module according to embodiments of the present disclosure.

In some optional embodiments, referring to FIG. 17, FIG. 17 illustrates a top-view structural schematic of another exemplary backlight module according to embodiments of the present disclosure. In one embodiment, the number of the notch 00 may be two.

In one embodiment, it may further illustrate that the number of the notch 00 may be two. The position and shape of the notch 00 may not be specifically limited according to various embodiments of the present disclosure, which may only need to be satisfied that the technical solution of above-mentioned embodiments may make the area adjacent to the notch 00 not to have the light-emitting shadow phenomenon of the backlight module because the light of the light source 40 may not or less enter the area. Therefore, the technical solution of above-mentioned embodiments may increase the light utilization efficiency of the compensation area CA and improve the light-emitting effect and quality of the backlight module 111.

In some optional embodiments, referring to FIG. 17, both two notches 00 may be formed on the first edge 10, and the first edge 10 may include two sub-edges 101, where the sub-edges 101 may respectively be recessed toward an inside of the light-emitting area LA to form two notches 00.

In one embodiment, it may further define that the two notches 00 may be formed on the first edge 10, so the light-emitting area LA may include two compensation areas CA correspondingly which may be disposed adjacent to the notches 00, and the two compensation areas CA may be respectively located on the sides of the two notches 00 away from the light source 40. Therefore, the thickening treatment may be performed on both light guide plates 50 in the range of the two compensation areas CA, thereby be more advantageous for the aggregation and transmission of the light emitted from the light source 40 at the thickened position of the light guide plate 50, increasing the light utilization efficiency of the two compensation areas CA and comprehensively and effectively improving the light-emitting effect and quality of the backlight module 111.

Figure 18:
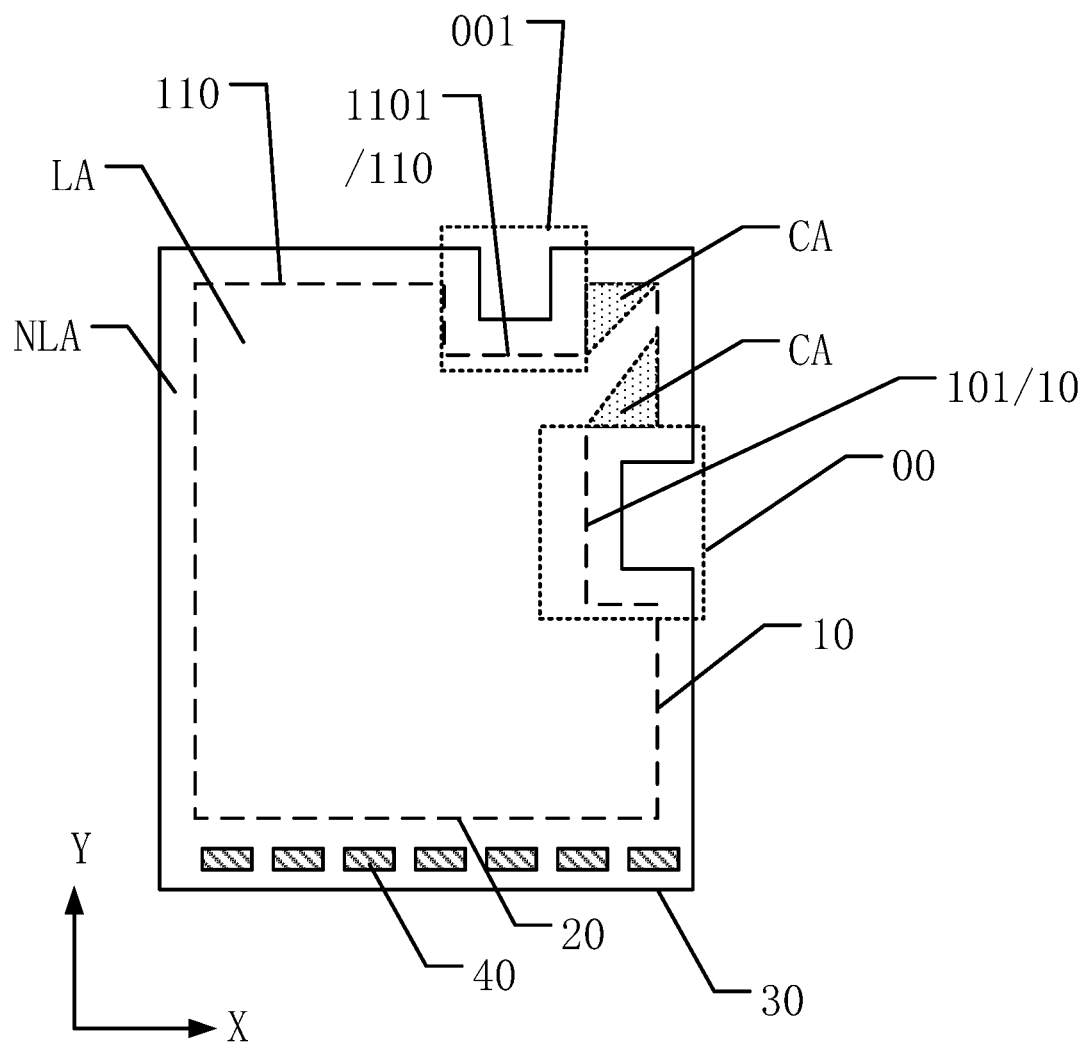
FIG. 18 illustrates a top-view structural schematic of another exemplary backlight module according to embodiments of the present disclosure.

In some optional embodiments, referring to FIG. 18, FIG. 18 illustrates a top-view structural schematic of another exemplary backlight module according to embodiments of the present disclosure. In one embodiment, a second notch 001 may be included. The light-emitting area LA may further include a third edge 110 and the second notch 001 may be formed on the third edge 110.

The third edge 110 may include a second sub-edge 1101. A remaining portion of the third edge 110 other than the second sub-edge 1101 may extend along the second direction X. The second sub-edge 1101 may be recessed toward an inside of the light-emitting area LA to form the second notch 001.

In one embodiment, it may further illustrate that, when the number of the notch 00 is two and the two notches are respectively formed on different edges, as shown in FIG. 18, the second notch 001 may be included; the light-emitting area LA may further include the third edge 110; and the second notch 001 may be formed on the third edge 110. The third edge 110 may include the second sub-edge 1101; a remaining portion of the third edge 110 other than the second sub-edge 1101 may extend along the second direction X; and the second sub-edge 1101 may be recessed toward the inside of the light-emitting area LA to form the second notch 001. That is, the remaining portion of the third edge 110 other than the second sub-edge 1101 and the second edge 20 may extend in the same direction, and the second notch 001 may be disposed opposite to the light source 40. Correspondingly, in one embodiment, the light-emitting area LA may include two compensation areas CA. One compensation area CA may be on the side of the notch 00 away from the light source 40, and the light of the light source 40 may not enter the region of the second notch 001 adjacent to the notch 00 due to the blocking of the notch 00. The other compensation area CA, as shown in FIG. 18, may be on the side of the second notch 001 adjacent to the notch 00. According to the technical solution of the above-mentioned embodiments, the thickening treatment may be performed on both light guide plates in the two compensation areas CA, thereby be more advantageous for the aggregation and transmission of the light emitted from the light source 40 at the thickened position of the light guide plate 50, increasing the light utilization efficiency of the two compensation areas CA and comprehensively and effectively improving the light-emitting effect and quality of the backlight module 111.

Figure 19:
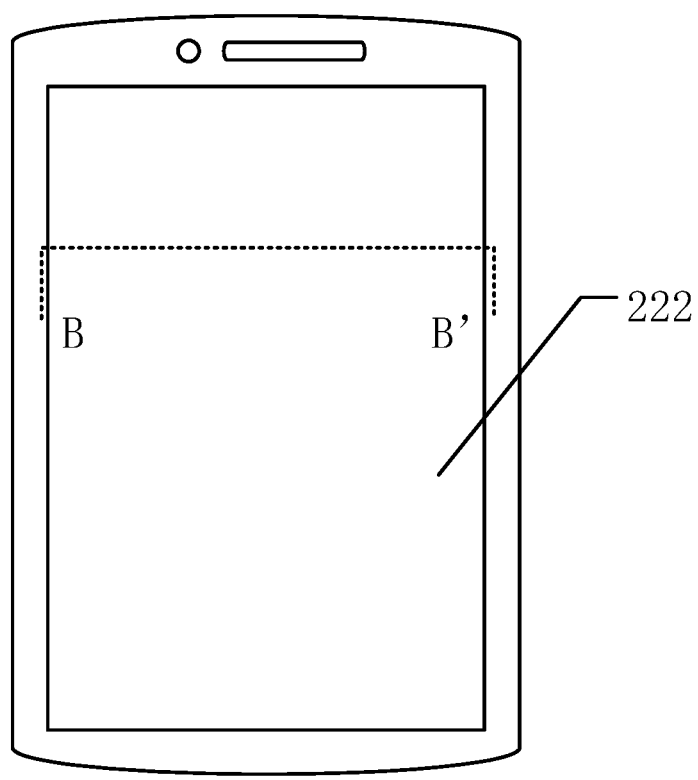
FIG. 19 illustrates a structural schematic of an exemplary display device according to embodiments of the present disclosure.
Figure 20:
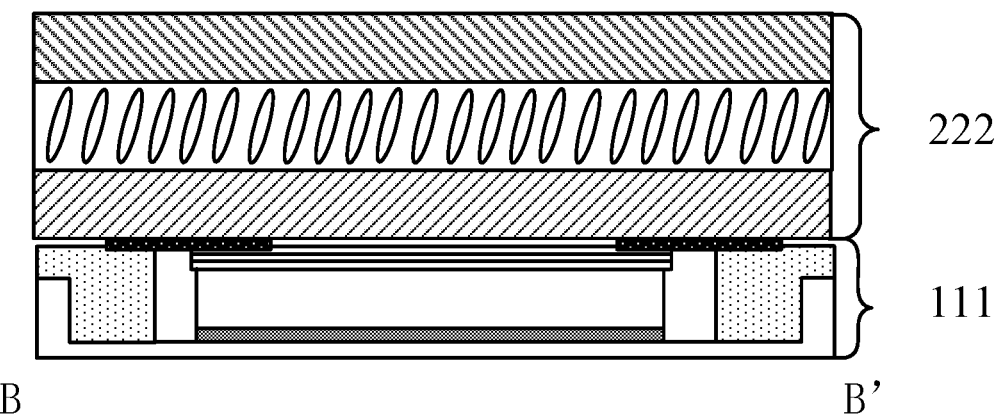
FIG. 20 illustrates a cross-sectional structural schematic along B-B' in FIG. 19.

In some optional embodiments, referring to FIG. 19, FIG. 19 illustrates a structural schematic of an exemplary display device according to embodiments of the present disclosure. FIG. 20 illustrates a cross-sectional structural schematic along B-B' in FIG. 19. A display device 1111 provided by embodiments may include a display panel 222 and the backlight module 111 of the above-mentioned embodiments which may disposed opposite to each other. Optionally, the display panel 222 may be a liquid crystal display panel. In FIG. 19, a mobile phone may only be used as an example for description of the display device 1111 in one embodiment. It should be understood that the display device 1111 provided by the embodiments of the present disclosure may be a display device 1111 having a display function, such as a computer, a television, an electronic paper, an in-vehicle display device, etc., which may not be specifically limited according to various embodiments of the present disclosure.

The display device 1111 provided by the embodiments of the present disclosure may have beneficial effects of the backlight module 111 provided by the embodiments of the present disclosure, and the details may refer to the detailed description of the backlight module 111 in the above-mentioned embodiments, which may not be described in one embodiment herein.

From the above-mentioned embodiments, it can be seen that the backlight module and the display device provided by the present disclosure achieve at least the following beneficial effects.

The light source of the backlight module may be on at least one side of the light guide plate, and the light emitting direction of the light source may face toward the light guide plate and the light source may be disposed extending along the second direction. That is, the backlight module may be an edge-lit backlight module and the light emitted from the light source may enter from the side of the light guide plate. The light guide plate may guide the light scattering direction, which may enable the light-emitting area of the backlight module to emit light uniformly, improve the display luminance of the backlight module and enable the uniform luminance. The light-emitting area may include at least one compensation area which may be disposed adjacent to the notch, and the compensation area may be on the side of the notch away from the light source in the first direction. The light guide plate may be configured as two portions which are the first portion and the second portion. The first portion may be in the compensation area and the second portion may be in the area of the light-emitting area other than the compensation area. The back plate may be on the side of the light guide plate away from the light emitting surface of the backlight module. The thickness of the first portion may be greater than the thickness of the second portion in the direction perpendicular to the back plate. The plurality of protrusions may be located on the side surface of the first portion facing toward the back plate. That is, the light guide plate corresponding to the compensation area may perform the thickening treatment in the direction perpendicular to the back plate, thereby be more advantageous for the aggregation and transmission of the light emitted from the light source at the first portion and increasing the light utilization efficiency of the compensation area. Furthermore, the plurality of protrusions facing toward the side of the back plate may be disposed at the thickened position of the light guide plate, which may enable the incident light on the positions of the protrusions to be more uniformly reflected, and enable the light in the range of the compensation area to be uniform, thereby improving the light-emitting effect and light-emitting quality of the backlight module.

Of course, any of the products embodying the present disclosure does not necessarily need meet all of the technical effects described above at the same time.

The details of the present disclosure have been described through the embodiments provided above. However, those skilled in the art should understand that the disclosed embodiments are exemplary only and are not intended to limit the scope of the present disclosure. Those skilled in the art should understand that the disclosed embodiments can be modified according to the scope and principles of the present disclosure. The scope of the present disclosure is defined by the appended claims and their equivalents.

What is claimed is:

1. A backlight module, comprising:
    a light-emitting area, a non-light-emitting area surrounding the light-emitting area, at least one notch, a shell, a light source and a light guide plate, wherein:
    the light-emitting area includes a first edge and a second edge; the first edge includes a sub-edge and a remaining portion of the first edge other than the sub-edge, the remaining portion of the first edge extending along a first direction; the second edge extends along a second direction; the sub-edge is recessed toward an inside of the light-emitting area to form the notch; and the first direction intersects the second direction;
    the shell contains an accommodating space to accommodate the light source and the light guide plate;
    the light source is on at least one side of the light guide plate; a light emitting direction of the light source faces toward the light guide plate; and the light source is configured extending along the second direction;
    the light-emitting area includes at least one compensation area adjacent to the notch, and the compensation area is on a side of the notch away from the light source in the first direction;

the light guide plate includes a first portion and a second portion, wherein the first portion is in the compensation area and the second portion is in a non-compensation-area of the light-emitting area; and the shell includes a back plate on a side of the light guide plate away from the light emitting surface of the backlight module; a thickness of the first portion is greater than a thickness of the second portion in a direction perpendicular to the back plate; and a plurality of protrusions is on a side surface of the first portion facing toward the back plate.

2. The backlight module according to claim 1, wherein:
an orthographic projection of the compensation area on the back plate overlaps an orthographic projection of the first portion on the back plate.

3. The backlight module according to claim 1, wherein:
surfaces of the first portion and the second portion on a side away from the back plate are on a same plane.

4. The backlight module according to claim 1, wherein:
the light guide plate further includes a connecting portion between the first portion and the second portion, and surfaces of the first portion, the connecting portion and the second portion on the side away from the back plate are on a same plane.

5. The backlight module according to claim 4, wherein:
a surface of the connecting portion on a side adjacent to the back plate is a first surface, and a surface of the connecting portion on a side away from the back plate is a second surface, where an acute angle is formed between the first surface and the second surface.

6. The backlight module according to claim 1, wherein:
heights of the plurality of the protrusions are different in a direction perpendicular to the back plate, and outer diameters of the plurality of the protrusions are different in a direction in parallel with the back plate.

7. The backlight module according to claim 1, further including:
a reflector, wherein the reflector is between the back plate and the light guide plate, and is attached to the light guide plate.

8. The backlight module according to claim 7, wherein:
the reflector at least includes a third portion and a fourth portion, wherein the third portion is attached to the first portion of the light guide plate and the fourth portion is attached to the second portion of the light guide plate.

9. The backlight module according to claim 8, wherein:
the third portion and the fourth portion are fixedly connected by a first connecting portion; and
one end of the first connecting portion is fixedly connected to the third portion and another end of the first connecting portion is fixedly connected to the fourth portion.

10. The backlight module according to claim 8, wherein:
the third portion and the fourth portion are formed into a single piece.

11. The backlight module according to claim 10, wherein:
the third portion includes a plurality of recessed portions which is recessed toward the back plate in a direction perpendicular to the back plate, and an orthographic projection of one of the plurality of recessed portions on the back plate overlaps an orthographic projection of a protrusion of the plurality protrusions on the back plate.

12. The backlight module according to claim 1, wherein:
the back plate at least includes a fifth portion and a sixth portion which are not on a same plane; an orthographic projection of the fifth portion on the light guide plate overlaps the first portion; and an orthographic projection of the sixth portion on the light guide plate overlaps the second portion.

13. The backlight module according to claim 12, wherein:
the fifth portion and the sixth portion are fixedly connected through a second connecting portion, wherein one end of the second connecting portion is fixedly connected to the fifth portion and an other end of the second connecting portion is fixedly connected to the sixth portion.

14. The backlight module according to claim 12, wherein:
the fifth portion and the sixth portion are formed into a single piece.

15. The backlight module according to claim 1, further including:
a diffuser plate and a brightness enhancement film, stacked one over another on a side of the light guide plate away from the back plate.

16. The backlight module according to claim 1, wherein:
a shape of the notch includes one of a rectangle, a rounded rectangle, a circle, and a trapezoid.

17. The backlight module according to claim 1, further including:
two notches, including the notch.

18. The backlight module according to claim 17, wherein:
both two notches are formed on the first edge; and the first edge includes two sub-edges respectively recessed toward the inside of the light-emitting area to form the two notches.

19. The backlight module according to claim 1, further including:
a second notch, wherein the light-emitting area further includes a third edge and the second notch is formed on the third edge; the third edge includes a second sub-edge; a remaining portion of the third edge other than the second sub-edge extends along the second direction; and the second sub-edge is recessed toward the inside of the light-emitting area to form the second notch.

20. A display device, comprising:
a display panel; and
a backlight module disposed opposite to the display panel, the backlight module including:
a light-emitting area, a non-light-emitting area surrounding the light-emitting area, at least one notch, a shell, a light source and a light guide plate, wherein:
the light-emitting area includes a first edge and a second edge; the first edge includes a sub-edge and a remaining portion of the first edge other than the sub-edge, the remaining portion of the first edge extending along a first direction; the second edge extends along a second direction; the sub-edge is recessed toward an inside of the light-emitting area to form the notch; and the first direction intersects the second direction;
the shell contains an accommodating space to accommodate the light source and the light guide plate;
the light source is on at least one side of the light guide plate; a light emitting direction of the light source faces toward the light guide plate; and the light source is configured extending along the second direction;
the light-emitting area includes at least one compensation area adjacent to the notch, and the compensation area is on a side of the notch away from the light source in the first direction;

the light guide plate includes a first portion and a second portion, wherein the first portion is in the compensation area and the second portion is in a non-compensation-area of the light-emitting area; and the shell includes a back plate on a side of the light guide plate away from the light emitting surface of the backlight module; a thickness of the first portion is greater than a thickness of the second portion in a direction perpendicular to the back plate; and a plurality of protrusions is on a side surface of the first portion facing toward the back plate.

* * * * *